(12) United States Patent
Yasui

(10) Patent No.: US 12,304,079 B2
(45) Date of Patent: May 20, 2025

(54) ROBOT CONTROL SYSTEM, ROBOT CONTROL METHOD, AND ROBOT CONTROL PROGRAM

(71) Applicant: TOYOTA JIDOSHA KABUSHIKI KAISHA, Toyota (JP)

(72) Inventor: Yuya Yasui, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 370 days.

(21) Appl. No.: 17/719,910

(22) Filed: Apr. 13, 2022

(65) Prior Publication Data

US 2022/0371191 A1   Nov. 24, 2022

(30) Foreign Application Priority Data

May 18, 2021   (JP) ................................ 2021-083861

(51) Int. Cl.
| | | |
|---|---|---|
| *B25J 9/16* | (2006.01) | |
| *B25J 9/00* | (2006.01) | |
| *B25J 13/08* | (2006.01) | |
| *B25J 15/00* | (2006.01) | |
| *B25J 19/02* | (2006.01) | |
| *G01S 17/08* | (2006.01) | |

(52) U.S. Cl.
CPC .......... *B25J 9/1653* (2013.01); *B25J 9/0009* (2013.01); *B25J 13/089* (2013.01); *B25J 15/0009* (2013.01); *B25J 19/022* (2013.01); *B25J 19/023* (2013.01); *G01S 17/08* (2013.01)

(58) Field of Classification Search
CPC ...... B25J 9/1653; B25J 9/0009; B25J 13/089; B25J 15/0009; B25J 19/022; B25J 19/023; B25J 11/003; B25J 19/021; G01S 17/08
See application file for complete search history.

(56) References Cited

U.S. PATENT DOCUMENTS

| 11,577,143 | B1* | 2/2023 | Ebrahimi Afrouzi .. A63B 69/40 |
| 2005/0224315 | A1* | 10/2005 | Rice .................. H01J 37/32743 |
| | | | 198/463.1 |
| 2011/0184558 | A1* | 7/2011 | Jacob ..................... B25J 9/1689 |
| | | | 901/47 |
| 2016/0310817 | A1* | 10/2016 | Yeager ................. A63B 69/406 |
| 2016/0350317 | A1* | 12/2016 | Bertossi ................ G06F 16/116 |
| 2020/0269448 | A1* | 8/2020 | Ooba ......................... B25J 9/10 |
| 2020/0283242 | A1* | 9/2020 | Osaka .................... B25J 9/1633 |

FOREIGN PATENT DOCUMENTS

JP   2019-063955 A   4/2019

* cited by examiner

*Primary Examiner* — Adam R Mott
*Assistant Examiner* — Ricardo I Viscarra
(74) *Attorney, Agent, or Firm* — Oliff PLC

(57) ABSTRACT

A robot control system includes: a mobile robot that controls movement of an object; an estimation unit that estimates a position of the object based on detection information of the object acquired by first sensors installed on base portions of the mobile robot; and a control unit that controls an end effector of the mobile robot. The control unit moves the end effector to the position estimated by the estimation unit, and controls the movement of the object using the end effector when a distance between the object and the second sensor acquired by the second sensor is equal to or less than a distance threshold value.

8 Claims, 4 Drawing Sheets

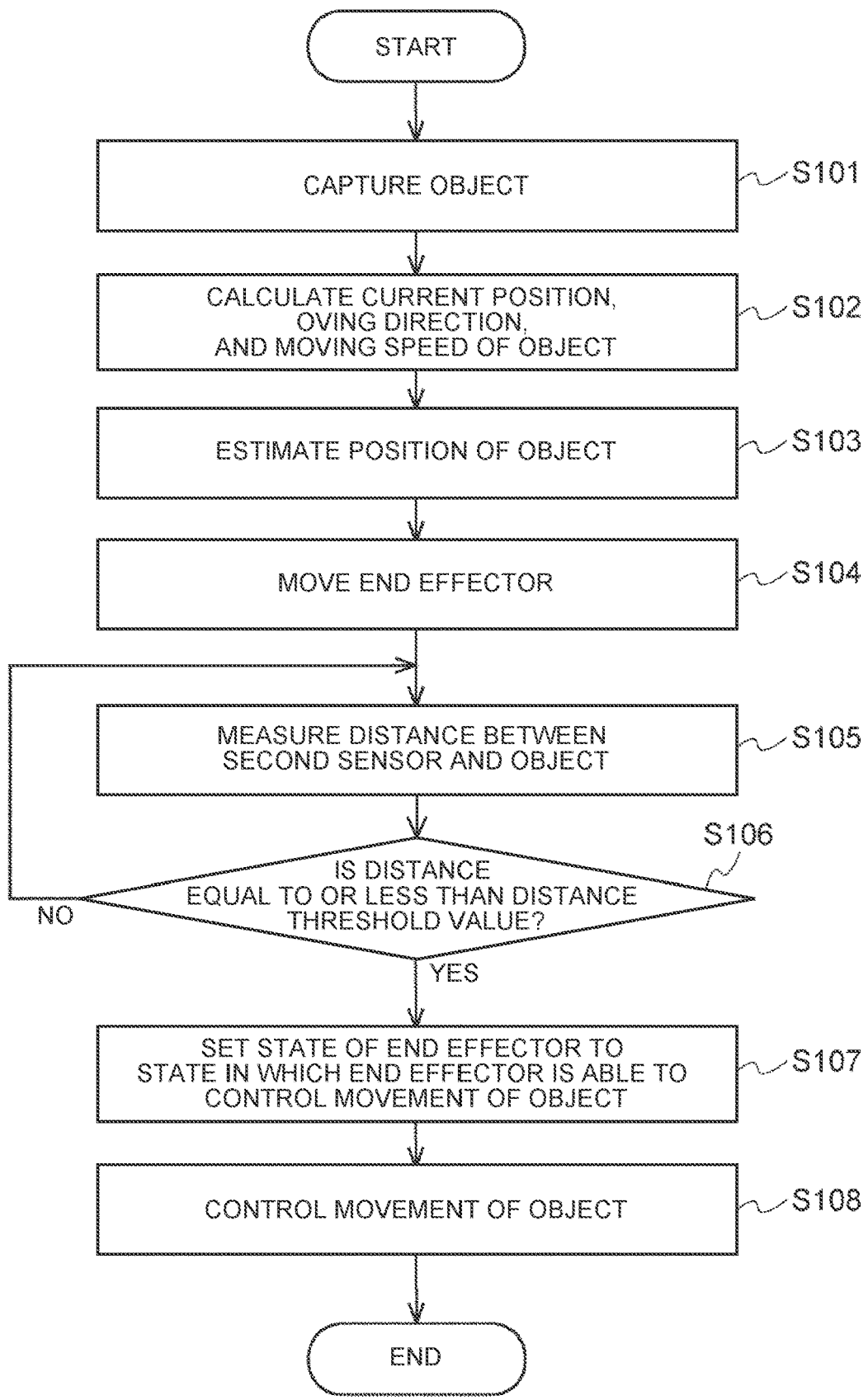

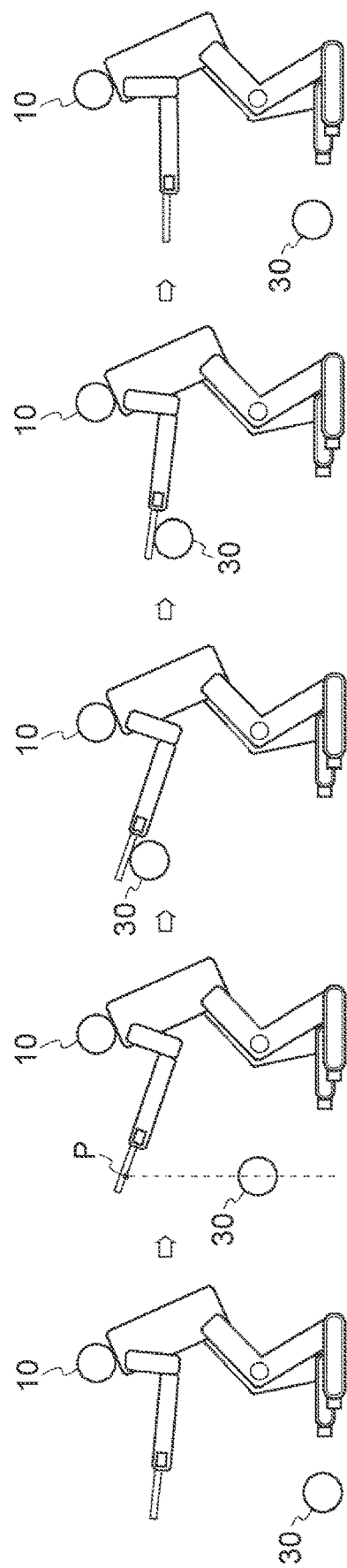

ROBOT CONTROL SYSTEM, ROBOT CONTROL METHOD, AND ROBOT CONTROL PROGRAM

CROSS-REFERENCE TO RELATED APPLICATION

This application claims priority to Japanese Patent Application No. 2021-083861 filed on May 18, 2021, incorporated herein by reference in its entirety.

BACKGROUND

1. Technical Field

The present disclosure relates to a robot control system that controls movement of an object, a robot control method, and a robot control program.

2. Description of Related Art

Conventionally, robots that handle objects have been developed. As an example of such a technique, in a robot system disclosed in Japanese Unexamined Patent Application Publication No. 2019-63955 (JP 2019-63955 A), a capturing device and a laser sensor are installed on a robot arm, and the image generated by the capturing device is used to calculate a position, a posture, a shape, and dimensions of an object mounted on a mounting surface, a distance from the laser sensor to the object is acquired, and the object is gripped.

SUMMARY

However, since the robot system disclosed in JP 2019-63955 A is a technique in which the stationary robot grips the object in a stationary state, there is a problem that the mobile robot cannot control movement of a moving object.

In order to solve such a problem, an object of the present disclosure is to provide a robot control system that controls movement of an object by using a mobile robot, a robot control method, and a robot control program.

A robot control system according to an aspect of the present disclosure includes a mobile robot that controls movement of an object,
in which the mobile robot includes
a base portion arranged on an arrangement surface,
a first sensor installed on the base portion,
an end effector that controls the movement of the object, and
a second sensor that is installed on the end effector and that detects a distance to the object,
in which the robot control system includes
an estimation unit that estimates a position of the object based on detection information of the object acquired by the first sensor, and
a control unit that controls the end effector, and in which the control unit
moves the end effector to the position estimated by the estimation unit, and
changes a state of the end effector into a state in which the end effector is able to control the movement of the object, when a distance between the object and the second sensor acquired by the second sensor is equal to or less than a distance threshold value.

The state in which the end effector is able to control the movement of the object includes a state in which the end effector is able to change the movement of the object.

The state in which the end effector is able to control the movement of the object includes a state in which the end effector is able to stop the movement of the object.

The first sensor can be a device that captures the object.

The distance threshold value is preferably equal to or less than a range of motion of the end effector when the end effector pushes down the object.

Further, the distance threshold value can be determined in accordance with a range of motion and an operation speed of the end effector when the end effector pushes down the object.

In a robot control method that controls a mobile robot that controls movement of an object according to one aspect of the present disclosure,
the mobile robot includes
a base portion arranged on an arrangement surface,
a first sensor installed on the base portion,
an end effector that controls the movement of the object, and
a second sensor that is installed on the end effector and that detects a distance to the object.
The robot control method includes
a step in which a computer estimates a position of the object based on detection information of the object acquired by the first sensor,
a step in which the computer moves the end effector to the estimated position, and
a step in which the computer changes a state of the end effector into a state in which the end effector is able to control the movement of the object, when a distance between the object and the second sensor acquired by the second sensor is equal to or less than a distance threshold value.

In a robot control program for controlling a mobile robot that controls movement of an object according to one aspect of the present disclosure,
the mobile robot includes
a base portion arranged on an arrangement surface,
a first sensor installed on the base portion,
an end effector that controls the movement of the object, and
a second sensor that is installed on the end effector and that detects a distance to the object.
The robot control program causes a computer to execute
a step of estimating a position of the object based on detection information of the object acquired by the first sensor,
a step of moving the end effector to the estimated position, and
a step of changing a state of the end effector into a state in which the end effector is able to control the movement of the object, when a distance between the object and the second sensor acquired by the second sensor is equal to or less than a distance threshold value.

The present disclosure relates to a robot control system that controls movement of an object by using a mobile robot, a robot control method, and a robot control program.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein:

FIG. 3 is a flowchart showing a process executed in the robot control system according to the aspect of the present disclosure; and FIG. 4 is a diagram showing a state in which a mobile robot according to the aspect of the present disclosure dribbles a ball.

DETAILED DESCRIPTION OF EMBODIMENTS

Figure 1:
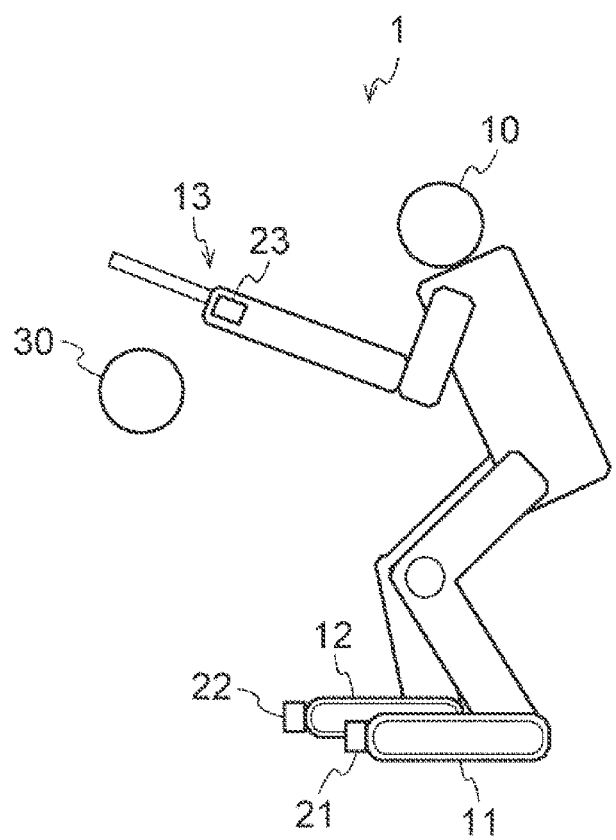
FIG. 1 is a diagram showing an example of a robot control system according to an aspect of the present disclosure.

Hereinafter, one aspect of the present disclosure will be described with reference to the drawings. FIG. 1 is a diagram showing an example of a robot control system according to an aspect of the present disclosure. A robot control system 1 includes a mobile robot 10 that controls the movement of an object 30. FIG. 1 shows a ball as an example of the object 30. The object 30 controlled by the robot control system 1 is not limited to this.

The mobile robot 10 includes base portions 11 and 12, first sensors 21 and 22, an end effector 13, a second sensor 23, and a control device (not shown).

The base portions 11 and 12 are parts of the mobile robot 10 arranged on an arrangement surface such as a floor. Specific examples of the base portions 11 and 12 include wheels, caterpillars, and feet of the mobile robot 10. The first sensors 21 and 22 are installed on the base portions 11 and 12. In the example shown in FIG. 1, two first sensors 21 and 22 are shown. However, three or more first sensors may be installed on the base portions 11 and 12.

The first sensors 21 and 22 are sensors that generate detection information such as captured images. The first sensors 21 and 22 are installed on the base portions 11 and 12. Specific examples of the first sensors 21 and 22 include devices such as an image sensor that captures the object 30. The first sensors 21 and 22 are installed at different positions on the base portions 11 and 12. As a result, the first sensors 21 and 22 can capture the object 30 from different viewpoints. As the first sensors 21 and 22, a device such as a laser radar capable of detecting the position of the object 30 may be adopted. It is also possible to adopt one first sensor or three or more first sensors.

By installing the first sensors 21 and 22 on the base portions 11 and 12, it is possible to reduce the shaking and blurring of the first sensors 21 and 22 compared to when the first sensors 21 and 22 are arranged on other parts of the mobile robot 10 such as on an upper part of the head portion of the mobile robot 10. Thus, it is possible to reduce the influence of shaking and blurring on the detection results of the first sensors 21 and 22.

The end effector 13 is a part of the mobile robot 10 that controls the movement of the object 30. The end effector 13 can have various shapes that can control the movement of the object 30. For example, the end effector 13 can be in the shape of a human hand. Further, the end effector 13 may be a suction device that sucks the object 30.

The second sensor 23 is a distance measuring sensor installed in the end effector 13 and measures the distance between the second sensor 23 and the object 30. Specific examples of the second sensor 23 include a distance measuring sensor such as a laser sensor. The second sensor 23 can measure the distance in a cycle shorter than the cycle in which the first sensors 21 and 22 generate detection information.

Figure 2:
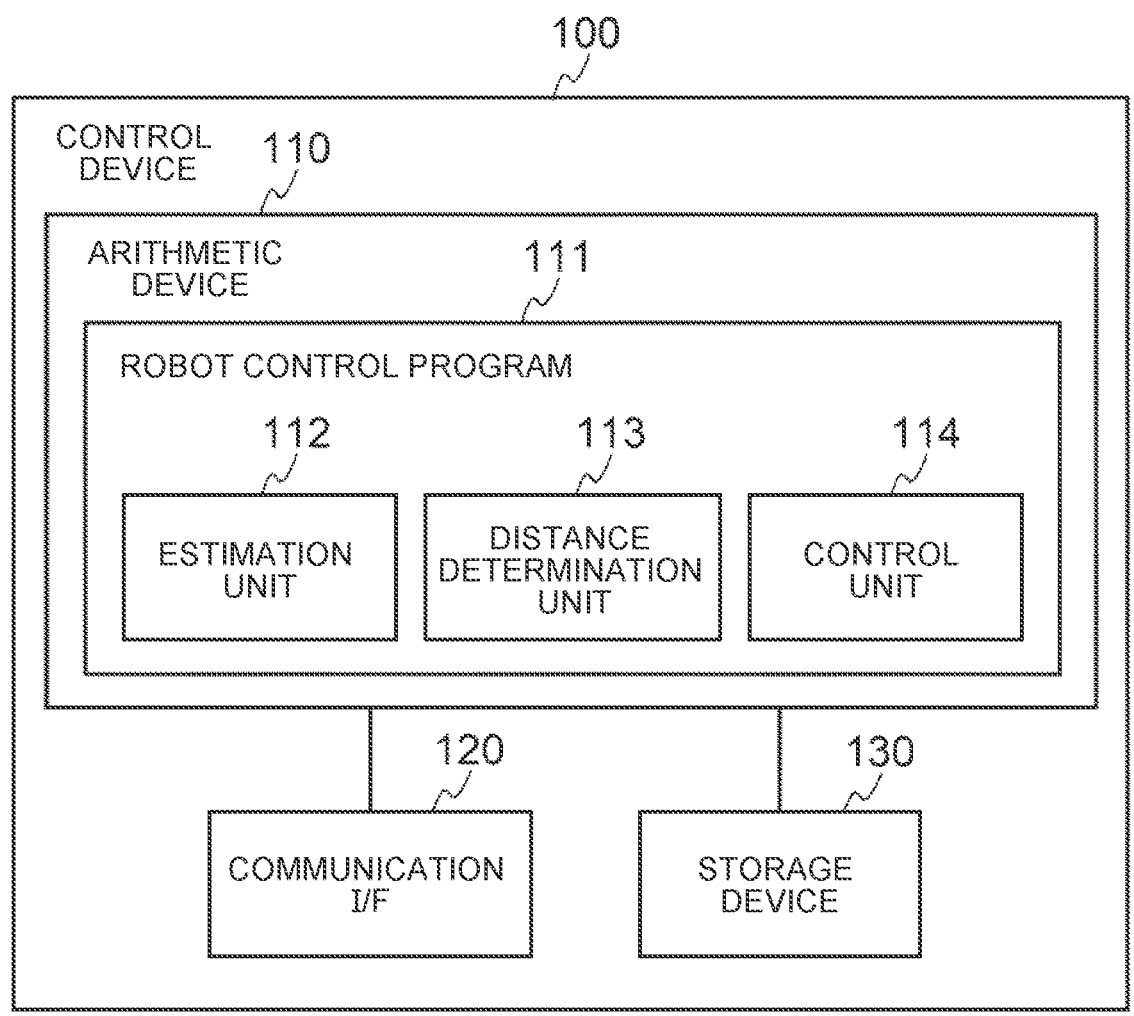
FIG. 2 is a block diagram showing a configuration of a control device according to the aspect of the present disclosure.

FIG. 2 is a block diagram showing a configuration of a control device according to the aspect of the present disclosure. A control device 100 is a device that controls the mobile robot 10. The control device 100 includes an arithmetic device 110, a communication interface (I/F) 120, and a storage device 130.

The arithmetic device 110 is an arithmetic device such as a central processing unit (CPU) or a micro processing unit (MPU) that controls an electronic circuit and an device included in the control device 100. The arithmetic device 110 executes the robot control method by reading a robot control program 111 from the storage device 130 and executing the robot control program 111. The robot control program 111 can be executed by a computer. In addition to the CPU and MPU, the computer includes various devices such as a personal computer (PC), a server, a field-programmable gate array (FPGA), and an application specific integrated circuit (ASIC).

The robot control program 111 includes an estimation unit 112, a distance determination unit 113, and a control unit 114. The estimation unit 112 is a program that calculates the current position, the moving direction, and the moving speed of the object 30 based on the detection information of the object 30 acquired by the first sensors 21 and 22, and estimates the position of the object 30. The estimation unit 112 calculates the position of the object 30 in the three-dimensional space by using the captured images generated by each of the first sensors 21 and 22. Next, the estimation unit 112 compares the positions of the object 30 calculated from each of the two pairs of captured images that are adjacent in time, and calculates the moving distance and the moving direction of the object 30. Then, the estimation unit 112 calculates the moving speed of the object 30 based on the moving distance of the object 30 and the shooting cycle of the two pairs of captured images.

The estimation unit 112 estimates the time required for the object 30 to reach the predetermined position based on the current position, the moving direction, and the moving speed of the object 30. For example, when the object 30 is bouncing, the estimation unit 112 can predict the highest reaching point of the object 30 at the predetermined position. In this case, the estimation unit 112 can predict the highest reaching point of the object 30 and the time until the object 30 reaches the highest reaching point by using the equation of motion. Further, as the predetermined position, an arbitrary position through which the object 30 passes when ascending may be adopted.

The distance determination unit 113 is a program provided by the second sensor 23 for determining the magnitude relationship between the distance between the second sensor 23 and the object 30 and the distance threshold value. The distance threshold value can be any value of zero or more. The distance threshold value can be determined in accordance with the method of controlling the movement of the object 30. For example, when the mobile robot 10 dribbles a ball that is the object 30, the distance threshold value is preferably equal to or less than the range of motion of the end effector 13 when the end effector 13 pushes down the object 30. As a result, the end effector 13 can be surely brought into contact with the object 30.

Further, the distance threshold value can be determined in accordance with the range of motion and the operation speed of the end effector 13 when the end effector 13 pushes down the object 30. In other words, the distance threshold value can be determined in accordance with the strength of the bounce of the ball. For example, when the operation speed of the end effector 13 when the end effector 13 pushes down the object 30 is high, that is, when the ball is strongly bounced, the distance threshold value can be reduced. In this case, the distance threshold value is preferably equal to or less than the range of motion of the end effector 13 when the end effector 13 pushes down the object 30.

In contrast, when the operation speed of the end effector 13 when the end effector 13 pushes down the object 30 is low, that is, when the ball is weakly bounced, the distance threshold value can be increased. In this case, the distance threshold value is preferably equal to or less than the range of motion of the end effector 13 when the end effector 13 pushes down the object 30. The distance threshold value may exceed the range of motion.

Further, when the mobile robot 10 grips the object 30, the distance threshold value can be set to be equal to or less than the distance by which the object 30 rises while the end effector 13 in the shape of a human hand closes the hand. In this case, it is preferable to set the distance threshold value in accordance with the size of the object 30. For example, when the object 30 is large, it is preferable to reduce the distance threshold value since the time required for closing the hand of the end effector 13 is short. In contrast, when the object 30 is small, it is preferable to increase the distance threshold value since it takes a long time to close the hand of the end effector 13. As a result, the end effector 13 can surely grip the object 30.

Further, when the object 30 is sucked, the threshold value can be set in accordance with the distance by which the object 30 rises in the time required for the end effector 13 to start sucking and exert the suction force capable of sucking the object 30.

The control unit 114 is a program that controls the end effector 13. The control unit 114 moves the end effector 13 to the position of the object 30 estimated by the estimation unit 112, and makes the state of the end effector 13 into the state in which the movement of the object 30 can be controlled. The state in which the movement of the object 30 can be controlled includes the state in which the movement of the object 30 can be changed. For example, the operation of moving the end effector 13 toward the bouncing object 30 in order to apply a downward force to the bouncing object 30 can be mentioned.

Further, the state in which the movement of the object 30 can be controlled includes the state in which the movement of the object 30 can be stopped. For example, the operation of the end effector 13 in the shape of a human hand opening the hand in order to grip the object 30 can be mentioned. Further, the operation in which the end effector 13 provided with the suction device starts suction in order to suck the object 30 can be mentioned.

The control unit 114 changes the state of the end effector 13 to the state in which the movement of the object 30 can be controlled, and causes the end effector 13 to control the movement of the object 30.

The communication interface (I/F) 120 is a device for communicating data between the control device 100 and the end effector 13, the first sensors 21 and 22, and the second sensor 23. The storage device 130 is a storage device that stores various data such as the robot control program.

FIG. 3 is a flowchart showing an example of the process executed by the robot control system 1. In step S101, the first sensors 21 and 22 capture the object 30. In step S102, the estimation unit 112 calculates the current position, the moving direction, and the moving speed of the object 30 by using a plurality of the captured images generated by the first sensors 21 and 22. In step S103, the estimation unit 112 estimates the position of the object 30 based on the current position, the moving direction, and the moving speed of the object 30.

In step S104, the control unit 114 moves the end effector 13 to the position of the object 30 estimated by the estimation unit 112. In step S105, the second sensor 23 measures the distance between the second sensor 23 and the object 30. In step S106, the distance determination unit 113 determines whether the distance between the second sensor 23 and the object 30 is equal to or less than the distance threshold value. When the distance between the second sensor 23 and the object 30 exceeds the distance threshold value (NO), the process returns to step S105. In contrast, when the distance between the second sensor 23 and the object 30 is equal to or less than the distance threshold value (YES), the process branches to step S107.

In step S107, the control unit 114 changes the state of the end effector 13 to the state in which the movement of the object 30 can be controlled. In step S108, the end effector 13 controls the movement of the object 30, and the process of FIG. 3 ends.

FIG. 4 is a diagram showing the mobile robot 10 dribbling the ball 30 that is the object. First, the first sensors 21 and 22 of the mobile robot 10 capture the ball 30 bouncing from the floor surface, and the estimation unit 112 estimates a predetermined position P of the ball 30 by using the captured image. Next, the control unit 114 moves the end effector 13 to the predetermined position P, and the second sensor 23 measures the distance between the second sensor 23 and the ball 30.

When the distance between the second sensor 23 and the object 30 becomes equal to or less than the distance threshold value, the control unit 114 changes the state of the end effector 13 to the state in which the movement of the ball 30 can be controlled. Specifically, the control unit 114 pushes down the end effector 13. Then, the end effector 13 comes into contact with the rising ball 30 and pushes down the ball 30. In this way, the mobile robot 10 can control the movement of the ball 30.

In the above-described embodiment, the mobile robot 10 includes the base portions 11 and 12 arranged on the arrangement surface, the first sensors 21 and 22 installed on the base portions 11 and 12, the end effector 13 that controls the object 30, and the second sensor 23 installed on the end effector 13. The control unit 114 moves the end effector 13 to the position estimated by the estimation unit 112, and when the distance between the object 30 and the second sensor 23 acquired by the second sensor 23 is equal to or less than the distance threshold value, the control unit 114 changes the state of 13 into the state in which the movement of the object 30 can be controlled. In this way, the mobile robot 10 can control the movement of the moving object 30.

As described above, the first sensors 21 and 22 are installed on the base portions 11 and 12 arranged on the arrangement surface. Thus, it is possible to reduce the shaking and blurring of the first sensors 21 and 22 compared to when the first sensors 21 and 22 are arranged on other parts of the mobile robot 10, especially, such as on an upper part of the head portion of the mobile robot 10. As a result, the estimation unit 112 can estimate the position of the object 30 based on the captured image taken in the state where there is little shaking or blurring. Thus, the accuracy of estimating the position of the object 30 is improved, and the end effector 13 can surely control the movement of the object 30.

Other Embodiments

In another embodiment, the control device 100 that is not incorporated in the mobile robot 10 may control the mobile robot 10. In this case, the control device 100 and the mobile robot 10 can communicate data with each other via wireless communication.

The program in the example described above includes a set of instructions (or software code) for causing the computer to perform one or more of the functions described in the embodiments when loaded into the computer. The program may be stored in a non-transitory computer-readable medium or a tangible storage medium. The example of the computer-readable medium or the tangible storage medium includes, but is not limited to, a random-access memory (RAM), a read-only memory (ROM), flash memory, a solid-state drive (SSD) or other memory technologies, a compact disc (CD)-ROM, a digital versatile disc (DVD), a Blu-ray (registered trademark) disc or other optical disc storages, a magnetic cassette, a magnetic tape, a magnetic disk storage or other magnetic storage devices. The program may be transmitted on a transitory computer-readable medium or a communication medium. The example of the transitory computer-readable medium or the communication medium includes, but is not limited to, an electrical, optical, acoustic, or other form of propagating signal.

The present disclosure is not limited to the above-described embodiments, and can be appropriately modified without departing from the spirit of the present disclosure.

What is claimed is:

1. A robot control system comprising:
a mobile robot configured to control movement of an object, the mobile robot including
a wheel or tracked treads,
a first sensor installed on the wheel or the tracked treads,
an end effector that controls the movement of the object, and
a second sensor that is installed on the end effector and that is configured to detect a distance to the object; and
a processor configured to
estimate a position of the object based on detection information of the object acquired by the first sensor,
move the end effector to the estimated position of the object, and
control the end effector to control the movement of the object, when a distance between the object and the second sensor, acquired by the second sensor, is equal to or less than a threshold distance, wherein
the threshold distance is equal to or less than a range of motion of the end effector when the end effector pushes down the object.

2. The robot control system according to claim 1, wherein the processor is configured to control the end effector to control the movement of the object by changing the movement of the object.

3. The robot control system according to claim 1, wherein the processor is configured to control the end effector to control the movement of the object by stopping the movement of the object.

4. The robot control system according to claim 1, wherein the first sensor is a device that captures images of the object.

5. The robot control system according to claim 1, wherein the threshold distance is determined in accordance with the range of motion and an operation speed of the end effector when the end effector pushes down the object.

6. A method for controlling a mobile robot configured to control movement of an object,
the mobile robot including
a wheel or tracked treads,
a first sensor installed on the wheel or the tracked treads,
an end effector that controls the movement of the object, and
a second sensor that is installed on the end effector and that is configured to detect a distance to the object, and
the method executed by a computer comprising:
estimating a position of the object based on detection information of the object acquired by the first sensor,
moving the end effector to the estimated position of the object, and
controlling the end effector to control the movement of the object, when a distance between the object and the second sensor, acquired by the second sensor, is equal to or less than a threshold distance, wherein
the threshold distance is equal to or less than a range of motion of the end effector when the end effector pushes down the object.

7. A non-transitory computer readable storage medium storing instructions that are executable by a processor and that cause the processor to perform functions comprising:
controlling a mobile robot configured to control movement of an object,
the mobile robot including
a wheel or tracked treads,
a first sensor installed on the wheel or the tracked treads,
an end effector that controls the movement of the object, and
a second sensor that is installed on the end effector and that is configured to detect a distance to the object, and
estimating a position of the object based on detection information of the object acquired by the first sensor,
moving the end effector to the estimated position of the object, and
controlling the end effector to control the movement of the object, when a distance between the object and the second sensor, acquired by the second sensor, is equal to or less than a threshold distance, wherein
the threshold distance is equal to or less than a range of motion of the end effector when the end effector pushes down the object.

8. The robot control system according to claim 1, wherein the second sensor is configured to measure the distance in a second cycle shorter than a first cycle in which the first sensor generates the detection information.

* * * * *